F. R. DANIELSON.
FOOTREST FOR TRACTORS.
APPLICATION FILED NOV. 1, 1919.
1,355,895.
Patented Oct. 19, 1920.
2 SHEETS—SHEET 1.
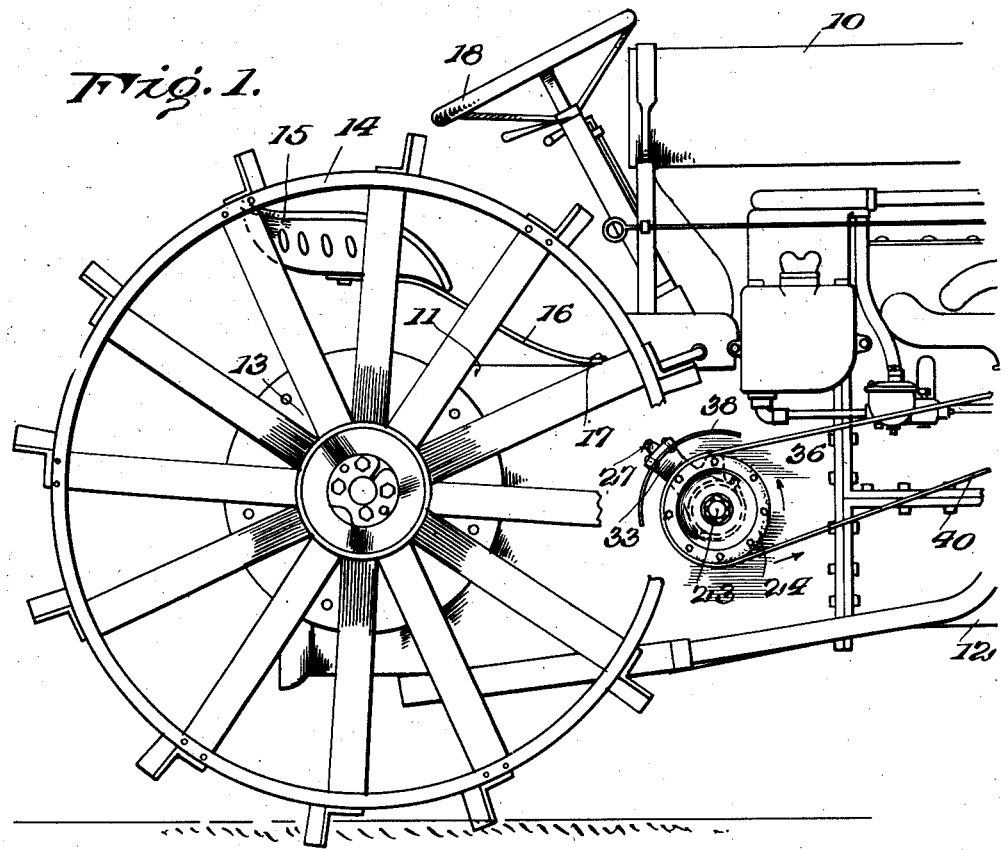
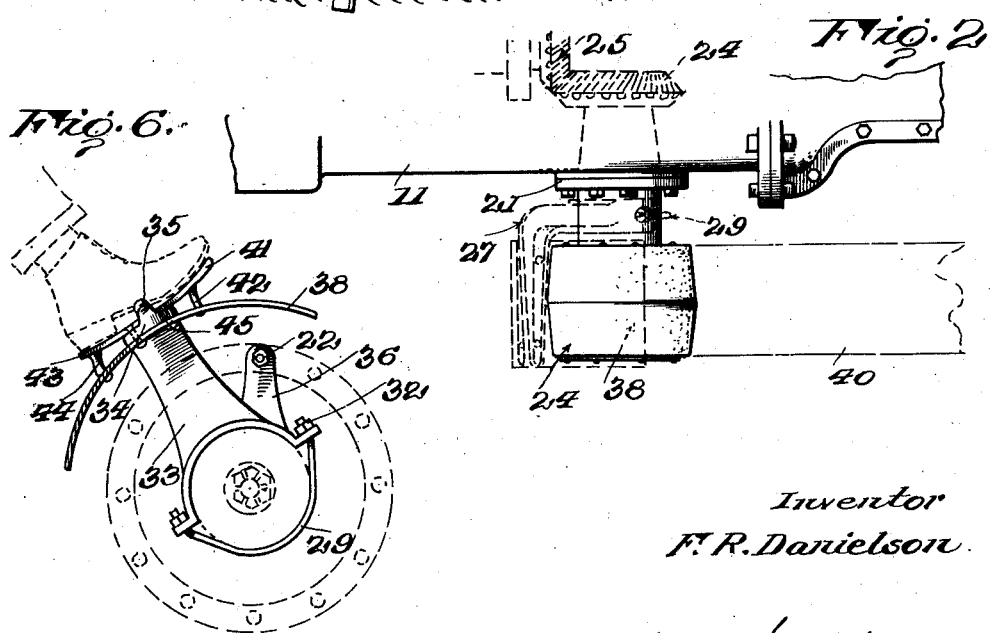
Inventor
F. R. Danielson
by Lacey & Lacey, Atty's

F. R. DANIELSON.
FOOTREST FOR TRACTORS.
APPLICATION FILED NOV. 1, 1919.

1,355,895.

Patented Oct. 19, 1920.

Inventor.
F. R. Danielson.
by Lacey & Lacey, his Atty's

UNITED STATES PATENT OFFICE.

FRANK R. DANIELSON, OF FAIRFIELD, IOWA.

FOOTREST FOR TRACTORS.

1,355,895.   Specification of Letters Patent.   Patented Oct. 19, 1920.

Application filed November 1, 1919. Serial No. 335,136.

*To all whom it may concern:*

Be it known that I, FRANK R. DANIELSON, a citizen of the United States, residing at Fairfield, in the county of Jefferson and State of Iowa, have invented certain new and useful Improvements in Footrests for Tractors, of which the following is a specification.

This invention relates to improvements in foot rests especially adapted for use on tractors.

The Fordson tractor is provided with a pulley mechanism which operates from the transmission and which is adapted to be detached when the tractor is used for field work such as plowing. When the pulley and the drive shaft therefor is detached from the transmission preparatory to using the tractor for field work, a cover plate is applied to the opening left by the removal of the pulley. This cover plate is provided with a rest on which the operator of the tractor places one foot while driving the tractor. However, it is frequently desirable to leave the pulley attached to the transmission while using the tractor for field work. As it requires some little labor to apply the pulley and properly mesh the gear of the same with the coacting gear of the transmission it would obviously be impractical to detach the pulley in case it is desired to use the tractor for field work for only a short period. Therefore, an important object of this invention is to provide a foot rest which may be conveniently applied when the pulley is attached in which case the cover plate carrying the ordinary foot rest is removed.

A further object of this invention is to provide a shield which may be arranged about the pulley to prevent the same from throwing mud in the direction of the operator while the tractor is being used for field work.

A further object of the invention is to provide a foot rest of the character described which is of highly simplified construction, simple to apply and cheap to manufacture.

Other objects and advantages of the invention will be apparent during the course of the following description.

In the accompanying drawings forming a part of this application and in which like numerals are employed to designate like parts throughout the same, Figure 1 is a fragmentary side elevation of a tractor having the improved foot rest and shield applied;

Fig. 2 is a fragmentary plan view of the tractor, the foot rest and shield being shown applied;

Fig. 6 is a side elevation of the improved foot rest having a toe and a heel plate applied thereto.

Figure 3:
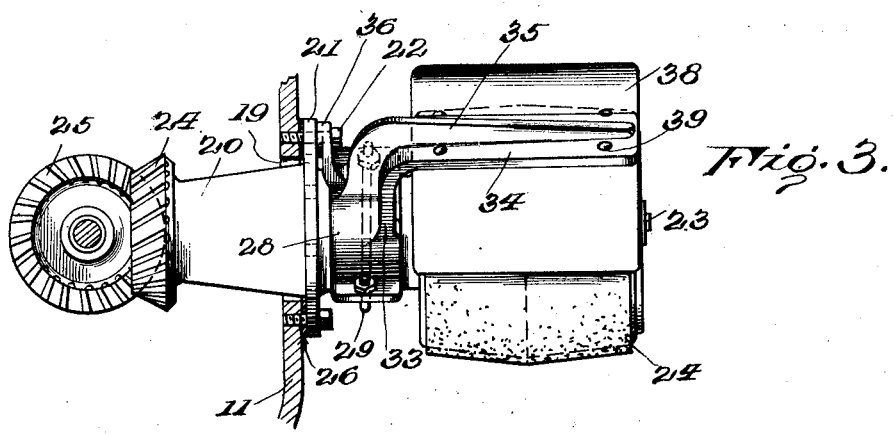
Fig. 3 is a detail section through the tractor illustrating the application of the invention.

In the drawings wherein for the purpose of illustration is shown a preferred embodiment of the invention, the numeral 10 generally designates a tractor commercially known as the Fordson. As illustrated in Fig. 1, the tractor includes a combined frame and transmission 11 which is connected at its front end to a motor 12 and at its rear end to a rear axle housing 13. Traction wheels 14 are keyed or otherwise connected to the rear axle (not shown). A seat 15 is arranged above the rear axle housing 13 and is supported by a seat spring 16 which as illustrated in Fig. 1 is secured to the transmission by suitable fastening devices 17.

When the tractor is used for field work, the operator naturally seats himself in the seat 15 and steers the tractor through the medium of a steering wheel 18. In the event that the pulley is applied to the transmission when the tractor is used for field work, the operator is forced to rest one foot upon the rear axle housing and is necessarily rendered very uncomfortable. In cases where the tractor is used for field work and the pulley is not applied, a cover plate is attached to the side of the transmission at the point where the pulley was formerly located and the foot rest carried by this cover plate is engaged by the foot.

As illustrated in detail in Fig. 3, one side wall of the transmission 11 is provided with an opening 19 through which is extended a shaft housing 20. The shaft housing 20 is provided with an annular attaching flange 21 which is rigidly secured to the side of the transmission by a plurality of cap screws 22.

A shaft 23 is extended through the housing and is provided at its inner end with a gear 24 which meshes with a second gear 25 permanently carried by the transmission and especially adapted for use when the pulley attachment is connected. The outer end portion of the shaft 23 is provided with a pulley 24 which is adapted for such uses as operating grain separators, wood sawing machinery, etc.

In applying the pulley attachment, it is essential to leave a small amount of play between the gear 24 and the gear 25 so that there will be no excessive friction and consequent noise. In the event that the gears 24 and 25 do not properly mesh, gaskets 26 which are arranged between the attaching flange 21 and the side wall of the casing must be added or removed to properly mesh the gears 24 and 25. As the removal of the pulley attachment preparatory to attaching the cover plate having the foot rest requires considerable time and labor the pulley attachment is frequently allowed to remain in position on the transmission when the tractor is used for field work. This, of course, precludes the possibility of using the foot rest which is carried by the cover plate of the transmission with the result that the operator of the tractor must rest one foot upon the rear axle housing 13.

An improved foot rest generally designated by the numeral 27 is adapted to be applied to the gear housing 20 when the pulley is attached to the transmission. As illustrated in detail in Figs. 3 and 4, the foot rest includes a semi-circular band 28 which is adapted to be applied to the housing 20 between the pulley and the attaching flange 21. A U-bolt 29 is arranged about the opposite side of the housing 20 and has its terminal portions 30 extended through laterally projecting ears 31 provided by bending the end portions of the semi-circular band 28 outwardly. Nuts 32 have threaded engagement with the arms 30 of the U-bolt and are adapted to be tightened for rigidly securing the semi-circular attaching band 28 to the housing. An L-shaped arm 33 is formed integral with the intermediate portion of the band 28 and is provided with a horizontal portion 34 which forms the foot rest. The L-shaped arm is provided with a longitudinally extending reinforcing rib 35 which is arranged on the outer side of the same and which serves as a means for limiting the accidental endwise movement of the foot. An attaching or anchoring bracket 36 is formed integral with the band 28 and is arranged along one edge adjacent one end portion of the same. The upper end portion of the bracket 36 has an opening 37 which receives one of the cap screws 22 having connection with the transmission whereby the accidental rotation of the band 28 on the housing is prevented. Longitudinal movement of the band 28 on the housing is also prevented by rigidly securing the bracket 36 to the annular flange 21.

Figure 4:
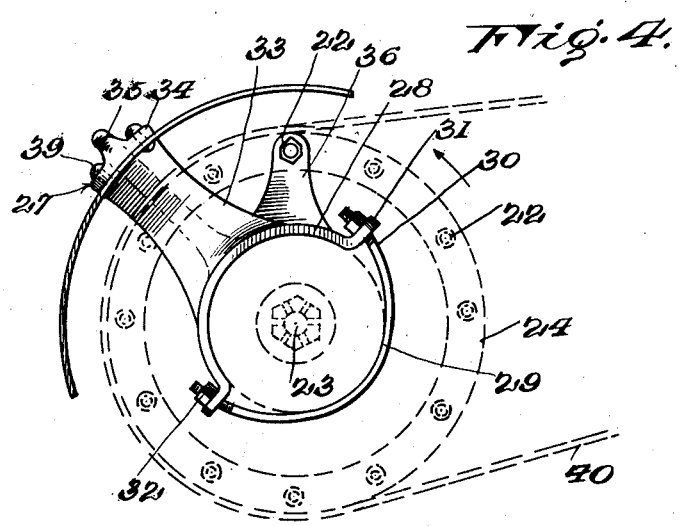
Fig. 4 is an end elevation of the pulley having the combined foot rest and shield applied.
Figure 5:
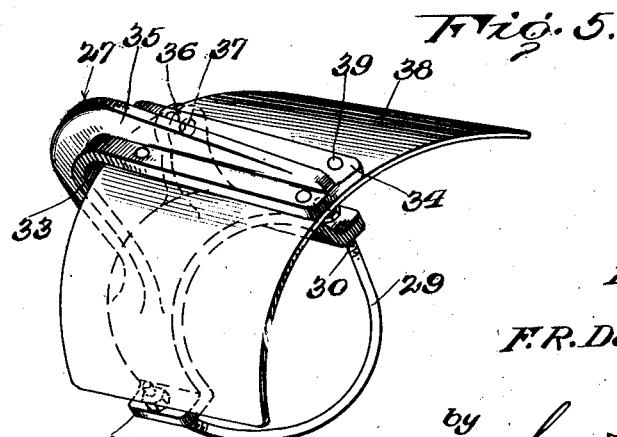
Fig. 5 is a perspective of the improved foot rest and shield.

When the pulley is attached to the transmission during the use of the tractor for field work, the pulley frequently throws up mud in the direction of the operator as the same is rotated at a very rapid speed, probably a thousand revolutions a minute. To overcome this difficulty I have provided an arcuate shield 38 of a heavy gage metal. The shield 38 is secured intermediate its ends to the under side of the arm 34 by rivets 39 and as illustrated in Fig. 4 is arranged in spaced parallel relation to the pulley and conforms to the curvature of the same.

The shield serves to effectively prevent mud and other particles from being thrown upwardly by the pulley during the movement of the tractor. With reference to Figs. 1 and 4 it will be noted that the shield is arranged at a point approximately between vertical and horizontal planes whereby the same is positioned directly between the pulley wheel and the operator.

In applying the improved foot rest and shield, the semi-circular band 28 is securely attached to the housing and the bracket 36 is also rigidly connected to the annular flange 21 as outlined. When the device is positioned as illustrated in Fig. 1, the free operation of the pulley is permitted and the tractor operator may conveniently rest one foot upon the support 34 without danger of contacting with the revolving pulley. In this connection it will be noted that the shield 38 also prevents the heel and toe portions of the foot from becoming engaged with the pulley.

As illustrated in Fig. 1, a belt 40 may be conveniently applied to the pulley without the necessity of removing the shield and foot rest.

In the form of the invention illustrated in Fig. 6, the foot rest is provided with a toe plate 41 which is provided with an attaching bracket or arm 42 secured to the shield 38 at a point spaced from the horizontal arm 34. A heel plate 43 is arranged on the other side of the arm 34 and is provided with a bracket 44 which is rigidly secured to the shield at a point spaced from the arm 34. The inner portions of the plates 41 and 43 are mounted upon the arm 34 on opposite sides of the reinforcing rib 35 and are secured to said arm by rivets 45. The toe and heel plates form a good bearing surface for the foot and prevent the foot from becoming uncomfortable as the result of engaging the rib 35. It will be noted that the upper longitudinal edge of the rib 36 is extended above the plane of the plates 41 and 43 and therefore acts to retain the foot in the position and to prevent the same from slipping lengthwise off the foot rest.

It is to be understood that the form of the invention herewith shown and described is to be taken as a preferred embodiment of the same and that such minor changes may be made as will remain within the spirit of the invention and the scope of what is claimed.

Having thus described the invention, what is claimed as new is:

1. The combination with a support, of a pulley carried by the support, an attaching member secured to said support, an L-shaped arm formed integral with said attaching member and overhanging said pulley, and a shield carried by said arm and arranged in spaced parallel relation to said pulley, said L-shaped arm being provided with means to secure the foot against accidental endwise movement.

2. A foot rest for tractors including an attaching member, an L-shaped foot supporting arm carried by said attaching member, and a shield carried by said L-shaped arm, said arm being provided with means for limiting the movement of the foot.

3. A foot rest attachment for tractor pulleys including an attaching member, an L-shaped foot supporting arm formed integral with said attaching member and arranged in spaced relation to the pulley of said tractor, and a bracket carried by said attaching member, said L-shaped arm being provided with means to secure the foot against accidental endwise movement.

4. An auxiliary foot rest for pulley attachments for tractors including an attaching member, an anchoring bracket carried by said attaching member, an L-shaped foot supporting arm carried by said attaching member and overhanging the tractor pulley, and a shield carried by the outer portion of said L-shaped arm and arranged in spaced parallel relation to said pulley, said L-shaped arm being provided with means to secure the foot against accidental endwise movement.

5. A foot rest attachment for tractor pulleys including an attaching member, an L-shaped foot supporting arm formed integral with said attaching member and extending from the intermediate portion of the same, and an arcuate shield connected to the outer portion of said L-shaped arm, said L-shaped arm being provided with means to secure the foot against accidental endwise movement.

6. An auxiliary foot rest for pulley attachments including a semi-circular attaching band having its end portions bent downwardly and apertured, a U bolt having arms extending through and rigidly connected to the outwardly extended portions of said band, an anchoring bracket secured along one edge of said semi-circular band, and a foot rest carried by said semi-circular band.

7. A foot rest for pulley attachments including an attaching band, an anchoring bracket formed integral with said band adjacent one end of the same, an L-shaped member extending from said band and having a longitudinally extending rib on its outer side, and the longitudinally curved shield connected intermediate its ends to the outer portion of said L-shaped member.

8. The combination with a tractor pulley attachment including a housing and a pulley, of a semi-circular band secured about said housing, a bracket formed integral with said band, an L-shaped arm formed integral with the intermediate portion of said band and having a horizontal portion overlying said pulley, and a shield secured to the under side of the horizontal portion of said L-shaped arm and arranged in spaced parallel relation to said pulley.

9. An auxiliary foot rest for pulley attachments for tractors including an attaching member, an anchoring bracket carried by said attaching member, an L-shaped arm carried by said attaching member and overhanging the tractor pulley, a shield carried by the outer portion of said L-shaped arm, and a toe and a heel plate mounted on the outer side of said shield.

10. A foot rest for pulley attachments including an attaching member, an L-shaped member secured to said attaching member and having a horizontal arm, and a shield secured to the under side of said horizontal arm, toe and heel plates secured to said shield and resting upon said horizontal arm at their inner end portions, and a reinforcing rib on the outer side of said horizontal arm and projecting above the plane of said toe and heel plates for securing the foot in position on said toe and heel plates.

11. A foot rest for the pulley attachment of a tractor comprising an arm, a shield carried by the arm and adapted for overhanging the pulley, and toe and heel plates mounted on said shield and engaging said arm, said arm being provided with means to secure the foot against endwise slipping.

12. A foot rest for the pulley attachment of a tractor comprising a semi-circular attaching band having its end portions formed with apertured ears, a U-shaped bolt having arms extended through said apertured ears, an anchoring bracket secured along one edge of said semi-circular band, a foot rest carried by said semi-circular band, and a shield carried by said foot rest.

In testimony whereof I affix my signature.

FRANK R. DANIELSON. [L. S.]